United States Patent
Lebeau et al.

(10) Patent No.: US 11,684,014 B2
(45) Date of Patent: Jun. 27, 2023

(54) GATHERING APPARATUS FOR SELECTIVELY BRINGING TOGETHER A FILM AT THE SIDES FOR WRAPPING AROUND A BALE

(71) Applicant: DEERE & COMPANY, Moline, IL (US)

(72) Inventors: Jonathan Lebeau, Dijon (FR); Pascal Gresset, Auxon Dessous (FR); Frederic Perrotin, Le Tremblois (FR)

(73) Assignee: DEERE & COMPANY, Moline, IL (US)

( * ) Notice: Subject to any disclaimer, the term of this patent is extended or adjusted under 35 U.S.C. 154(b) by 448 days.

(21) Appl. No.: 16/840,951

(22) Filed: Apr. 6, 2020

(65) Prior Publication Data

US 2020/0323143 A1    Oct. 15, 2020

(30) Foreign Application Priority Data

Apr. 12, 2019    (DE) .......................... 102019205334.3

(51) Int. Cl.
*A01F 15/07*    (2006.01)
(52) U.S. Cl.
CPC ................. *A01F 15/0715* (2013.01)
(58) Field of Classification Search
CPC .... A01F 15/00; A01F 15/071; A01F 15/0715; A01F 15/0745; A01F 2015/0735
See application file for complete search history.

(56) References Cited

U.S. PATENT DOCUMENTS

| | | | |
|---|---|---|---|
| 4,235,062 A | 11/1980 | Lancaster, III et al. | |
| 4,656,812 A * | 4/1987 | Busse | A01F 15/0715 53/118 |
| 4,807,427 A * | 2/1989 | Casteel | B65B 11/006 53/389.2 |
| 4,841,851 A * | 6/1989 | Quataert | A01F 15/0705 53/118 |
| 5,079,898 A * | 1/1992 | Springs | A01F 15/0715 53/399 |
| 5,631,826 A * | 5/1997 | Chow | A01F 15/071 700/84 |
| 6,971,220 B1 * | 12/2005 | Rampp | A01F 15/071 53/449 |

(Continued)

FOREIGN PATENT DOCUMENTS

| | | |
|---|---|---|
| DE | 10045843 A1 | 3/2002 |
| DE | 102009010547 B3 | 6/2010 |

(Continued)

OTHER PUBLICATIONS

European Search Report issued in counterpart application No. 20168464.4 dated Sep. 30, 2020 (07 pages).

*Primary Examiner* — Chelsea E Stinson (57) ABSTRACT

A gathering apparatus for selectively bringing together edges or sides of a film for wrapping around a bale includes a pair of gathering elements which cooperate with a respective edge of the film and which are movable by a drive. The drive is actuated by a motor and a reduction gear. The gathering elements are moved relative to the film in a lateral direction between an out-of-operation position and an operating position, in order to gather the film as required. A holding apparatus serves the gathering elements in the operating position.

22 Claims, 4 Drawing Sheets

(56) References Cited

U.S. PATENT DOCUMENTS

| | | | |
|---|---|---|---|
| 9,326,449 B2* | 5/2016 | Van Amstel | A01F 15/0715 |
| 2004/0055268 A1* | 3/2004 | Schuster | A01F 15/0715 |
| | | | 56/341 |

FOREIGN PATENT DOCUMENTS

| | | | |
|---|---|---|---|
| EP | 2022318 | A1 | 2/2009 |
| EP | 3278658 | A1 | 2/2018 |
| GB | 2249077 | A | 4/1992 |
| WO | WO0064237 | A1 | 11/2000 |

* cited by examiner

GATHERING APPARATUS FOR SELECTIVELY BRINGING TOGETHER A FILM AT THE SIDES FOR WRAPPING AROUND A BALE

CROSS-REFERENCE TO RELATED APPLICATIONS

This application claims priority to and the benefit of German Patent Application No. 102019205334.3, filed on Apr. 12, 2019, the disclosure of which is hereby incorporated by reference.

TECHNICAL FIELD

The disclosure generally relates to a gathering apparatus for a round baler.

BACKGROUND

Round balers are used in agriculture in order to pick up from the ground and to press harvested crops in a bale forming chamber, which is delimited by rotating elements in the form of rollers, belts or chains, to form a bale. Stationary balers which are used, amongst other things, for pressing waste materials are also available. The finished bale is generally subsequently wrapped with a wrapping material in the bale forming chamber or in an additional wrapping device in order to prevent it from falling apart. The wrapping material may, in particular, be twine, netting or film.

If film is wrapped around the bale, it may be expedient to bring the sides of the film together (i.e., to gather the sides of the film) at the start of the wrapping process, so that it may be supplied more easily to the bale than a film extended to its full width (WO 00/64237 A1, DE 100 45 843 A1). It has also been proposed to gather the sides of the film after it has been wrapped around the bale, in order to cut it off more easily than a film extended to its full width (DE 10 2009 010 547 B3, EP 3 278 658 A1) so that the last winding of the film is not unwrapped by a winding action (see EP 2 022 318 A1 regarded as generic).

In all of the aforementioned supply devices, two gathering elements cooperating with the edge of the film are moved relative to the sides of the film (i.e. displaced or pivoted symmetrically to one another) in order to gather the sides of the film together. A drive which is actuated by remote force and which is coupled via a drive train to the gathering elements serves therefor. This means that the drive and the drive train between the drive and the gathering element also have to provide the force in order to bring together the film. These forces may be relatively high in the case of thicker films and may lead to wear in the drive train and in the drive, so that both the drive train and the drive have to be designed to be sufficiently stable and thus large, heavy and cost-intensive. Additionally, it has to be ensured that when they are located in the operating position the gathering elements are not pulled apart again by the force of the film.

SUMMARY

A gathering apparatus serves for selectively bringing together the sides of a film for wrapping around a bale. It includes a first gathering element and a second gathering element, which each cooperate with a respective edge of the film and which are movable by at least one drive, which is actuated by remote force. The drive may include, but is not limited to, a motor and a reduction gear. The drive moves the first and second gathering elements relative to the film in a lateral direction, between an out-of-operation position and an operating position, in order to gather the sides of the film together. A holding apparatus is operable to secure the gathering element in the operating position.

In this manner, the holding apparatus applies a holding force to secure the gathering apparatus in the operating position while the film is gathered together. As such, because the drive and the drive train do not need to supply the holding force, the drive and the drive train may be designed in a more cost-efficient manner.

The disclosure provides two aspects of the holding apparatus that may be used together or individually. The first aspect includes electrically braking and/or blocking an electric motor of the drive. In the case of a DC motor, which when it is not driven electrically acts as a generator, this can take place by a resistor or short circuit cooperating with the terminals of the DC motor. In the case of three-phase current motors, a corresponding activation of the inverter may take place which serves to stop and secure the motor. The second aspect includes a holding apparatus which acts mechanically on the drive train of the gathering element, thereby coupling the gathering element to the motor, which acts as a brake or latching connection at any point in the drive train.

The gathering apparatus may include two gathering elements which in each case cooperate with an edge of the film and which in each case are movable in opposing directions by a drive, which is actuated by remote force, relative to the film in the lateral direction between an out-of-operation position and an operating position, and which are able to be secured by a holding apparatus in the operating position. The gathering elements may be movable by a common drive or separate drives.

It might be conceivable to block each of the gathering elements separately, by the gathering element being coupled by a holding apparatus to the frame of the baler or the bale wrapper. A simplification is possible by the gathering elements being coupled together by the holding apparatus in the operating position, since only a single holding element has to be activated to this end.

The holding apparatus may include an electromagnet which may be switched on and off and which is designed to hold together holders connected to each of the gathering elements in the operating position. In a further embodiment, a permanent magnet which holds together the holders in the operating position may be used. The holders may be separated again by the drive as required.

In a further implementation of the disclosure, the holding apparatus may include a bolt or hook which is actuated by an actuator, and which is designed to hold together a respective holder that is connected to each of the gathering elements in the operating position.

In one aspect of the disclosure, the drive may include an electric motor which is coupled via a tractive means (i.e. a belt drive or chain drive) to the gathering element may be considered as the drive. However, any other drives (for example one or more hydraulic cylinders or hydraulic motors) and drive trains may also be used.

In one aspect of the disclosure, the described gathering apparatus may be used on a baler or a bale wrapper which is provided with a receiving space for a bale, a film which may be unwrapped from a storage roller being able to be supplied thereto by a supply apparatus, wherein between the storage roller and the receiving space the supply apparatus is assigned a cutting apparatus for cutting off the film and a gathering apparatus.

The baler or the bale wrapper may have a control apparatus which may be operated to control a drive of the cutting apparatus and the drive of the gathering apparatus, such that initially, a gathered film and subsequently an un-gathered film are wrapped around a finished bale and finally the film is cut off in the gathered or the un-gathered state.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Figure 1:
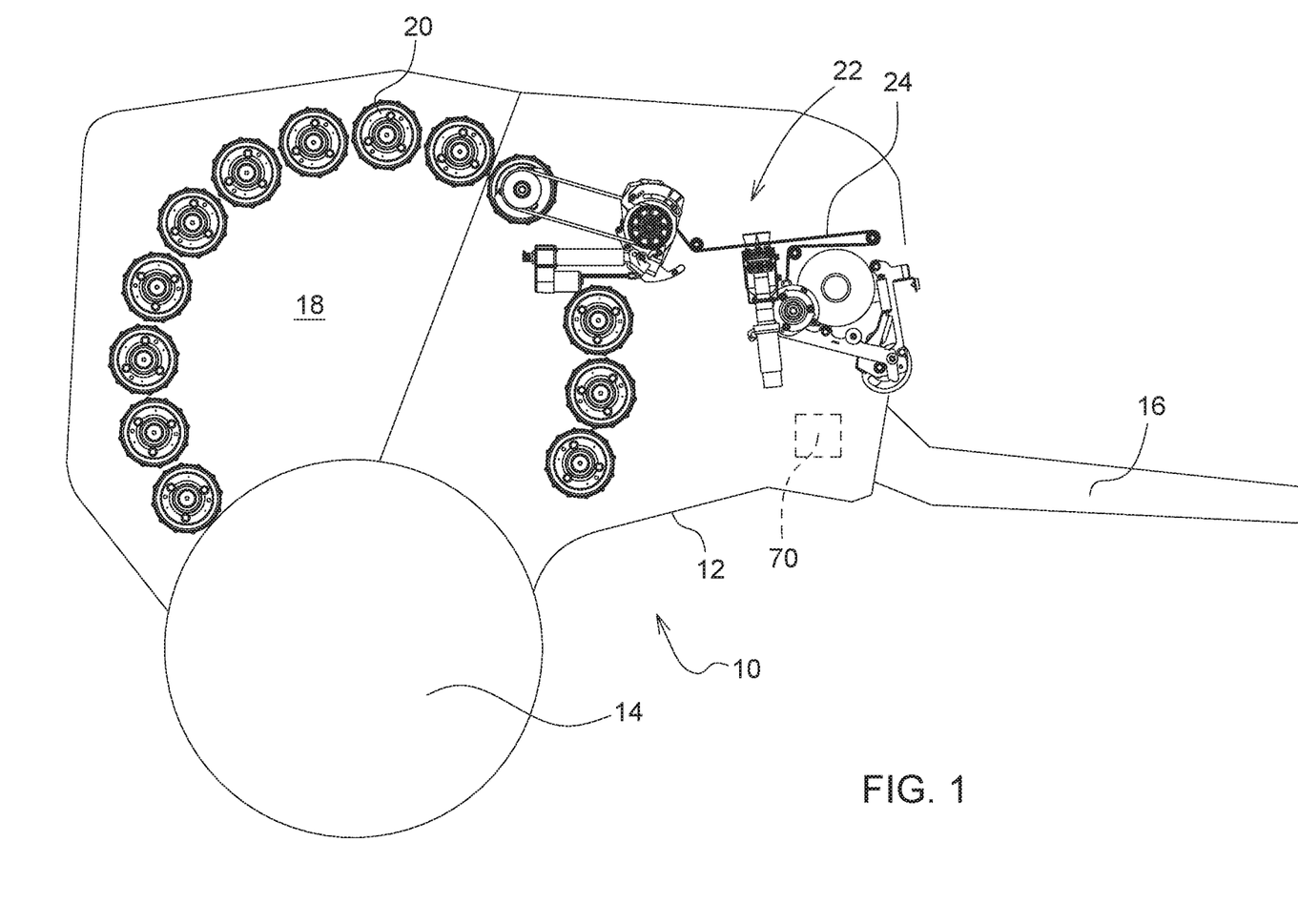
FIG. 1 is a schematic side view of a baler.

Referring to the Figures wherein like numerals represent like features throughout the views, FIG. 1 shows a round baler 10 having a chassis 12 which is supported on wheels 14 and which may be coupled by a tow bar 16 to a tractive vehicle (not shown), in order to pull the round baler 10 in a forward direction (to the right in FIG. 1) over a field. The round baler 10 may further include a pick-up assembly (not shown) for picking up harvested crops (not shown), and which during operation conveys the harvested crops from below into a bale pressing chamber 18 which is encircled by driven rollers 20. A housing of the round baler 10 is able to be brought into an opened position on the rear face in order to eject the finished bale. The round baler 10 shown generates bales of a predetermined size, since the rollers 20 are attached fixedly to the chassis 12. However, it could also be designed as a round baler with a bale pressing chamber 18 of variable size. In order to be able to wrap film 24 around a finished bale, a supply apparatus 22 for film 24 is provided. An example implementation of the supply apparatus is shown enlarged in FIG. 2 and is operable to convey the film 24 through a gap provided between two of the rollers 20 into the bale pressing chamber 18.

Figures 2, 3:
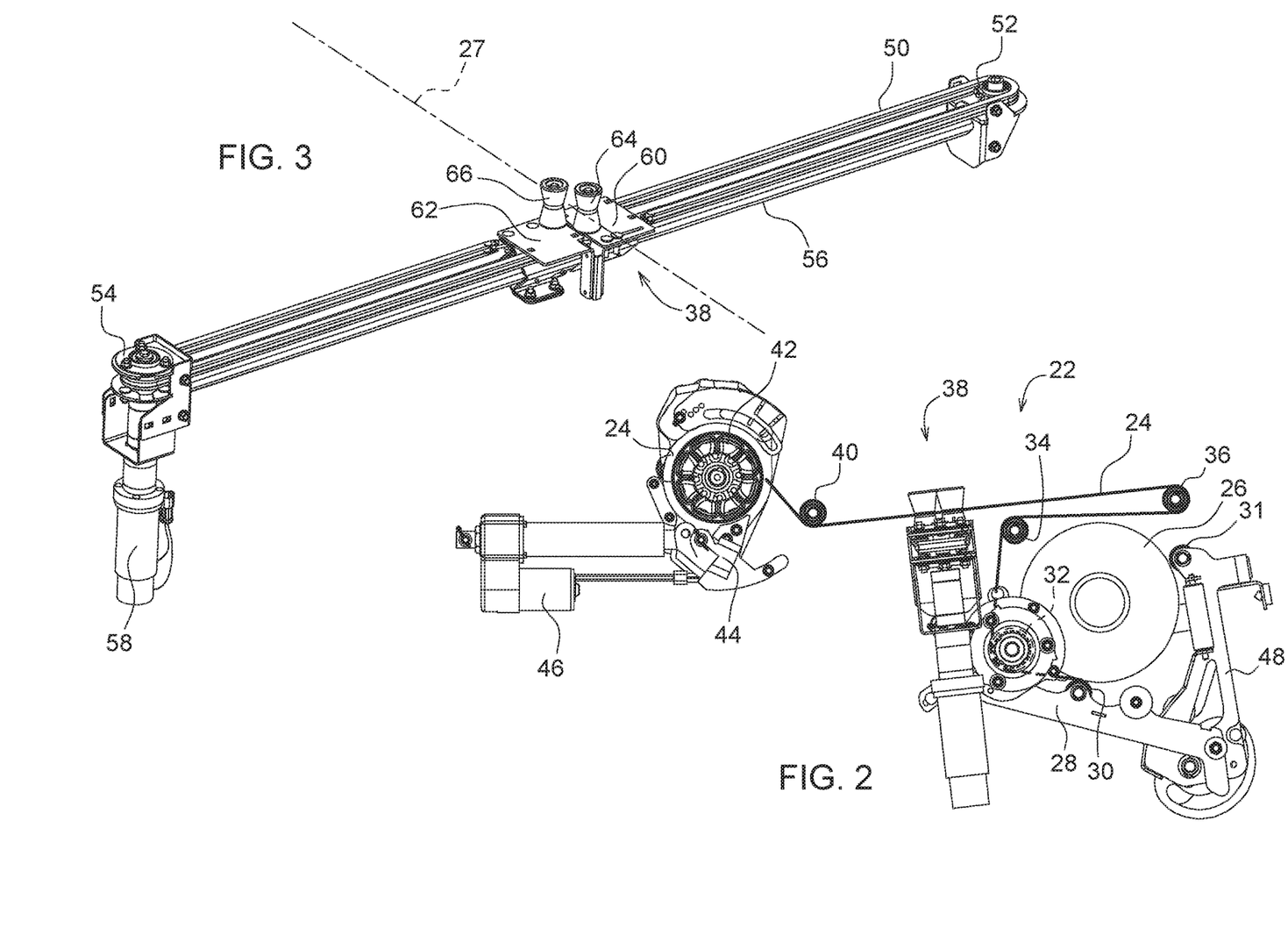
FIG. 2 is a schematic side view of a film supply apparatus of the baler.
FIG. 3 is a schematic perspective view of a gathering apparatus of the supply apparatus, showing the gathering apparatus in an operating position.

FIG. 2 shows an enlarged view of the supply apparatus 22. A rolled-up supply 26 of film 24 is supported on a lower roller 30 which is attached to a support 28 coupled to the chassis 12. The film 24 has a first lateral side and an opposing second lateral side, and extends along a longitudinal center 27 of the supply or roll 26. A rear roller 31, the supply 26 bearing against the rear roller 31, is fastened to a swing arm 48 which may be folded to the front and downwardly in order to replace the supply 26. The film 24 runs from the supply 26 over a larger roller 32 which is partially wound around by the film 24 (which may serve for braking the film 24 and thus for producing a desired tensioning in the film 24) over further rollers 34, 36, 40, 42 into the bale pressing chamber 18. The roller 42 is assigned a cutting apparatus 44 which is operated by an actuator 46 in order to cut off the film 24 after it has been wrapped around a bale.

A gathering apparatus 38 is operable to bring together, gather, or bunch, the opposing lateral sides of the film 24 to a reduced lateral width. The gathering apparatus 38 is arranged between the rollers 36 and 40. The gathering apparatus 38 is shown enlarged in FIG. 3. The gathering apparatus includes an endless tractive means or tractive member 50 in the form of a chain, a (toothed) belt, or the like, which circulates around two deflection wheels, i.e., a first deflection wheel 52 and a second deflection wheel 54, which are connected together by a strut 56. The strut 56 spans across a width of the film 24. The second deflection wheel 54 is able to be set in rotation by a drive 58. The drive 58 may include, but is not limited to, an electric motor which is coupled by a reduction gear to the second deflection wheel 54. The gathering apparatus 38 includes a first holder 60 and a second holder 62. One respective holder 60 or 62 is fixedly attached to each of the two runs of the tractive member 50. By switching the drive 58 on and off and/or reversing the drive 58, a control apparatus 70 (see FIG. 1) may accordingly command the holders 60, 62 to move symmetrically to one another and in each case in opposing directions toward one another into the operating position shown in FIG. 3, or into a pulled apart out-of-operation position (not shown) in which the holders 60, 62 are located in the vicinity of the deflection wheels 52 and/or 54. The holders 60, 62 in each case bear respective gathering elements, i.e., a first gathering element 64 or a second gathering element 66 which are designed in this case as double cones, i.e. shaped in the manner of an hourglass. The strut 56 may serve as a guide for the holders 60, 62, which may be supported by plain bearings or rolling bearings on the strut 56. The gathering elements 64, 66 may be attached to the holders 60, 62 rigidly or freely rotatably about the longitudinal axis thereof which extends vertically in FIG. 3.

The strut 56 extends transversely relative to a width of the film 24 and parallel to the transverse direction of the film 24. The length of the strut 56 is slightly greater than the width of the film 24 so that in their out-of-operation position the gathering elements 64, 66 bear with their central regions, in which their diameter is at the smallest, against the lateral edges of the film 24 (in order to guide the film 24 at the sides and in a vertical direction) or adopt a slight spacing therefrom. In the operating position as is shown in FIG. 3, the gathering elements 64, 66 bring together the lateral sides of the film 24, i.e. they gather the film 24, so that at the start of a wrapping process it may be introduced into the bale pressing chamber 18 more easily than the film 24 guided over its full width and/or at the end of the wrapping process it may be more easily cut by the cutting apparatus 44 than the film 24 guided over its full width.

Since the film 24, in particular when it is relatively thick, exerts significant forces or load on the gathering elements 64, 66, the holders 60, 62, the tractive members 50 and the drive 58 and the gear located therein, a holding apparatus 68 is provided in order to couple together the holders 60, 62 and thus the gathering elements 64, 66 in the operating position and to relieve the drive 58, the gear and the tractive members 50 of the load, so that they may be of a more lightweight, smaller, and more cost-effective design.

Figures 4, 5:
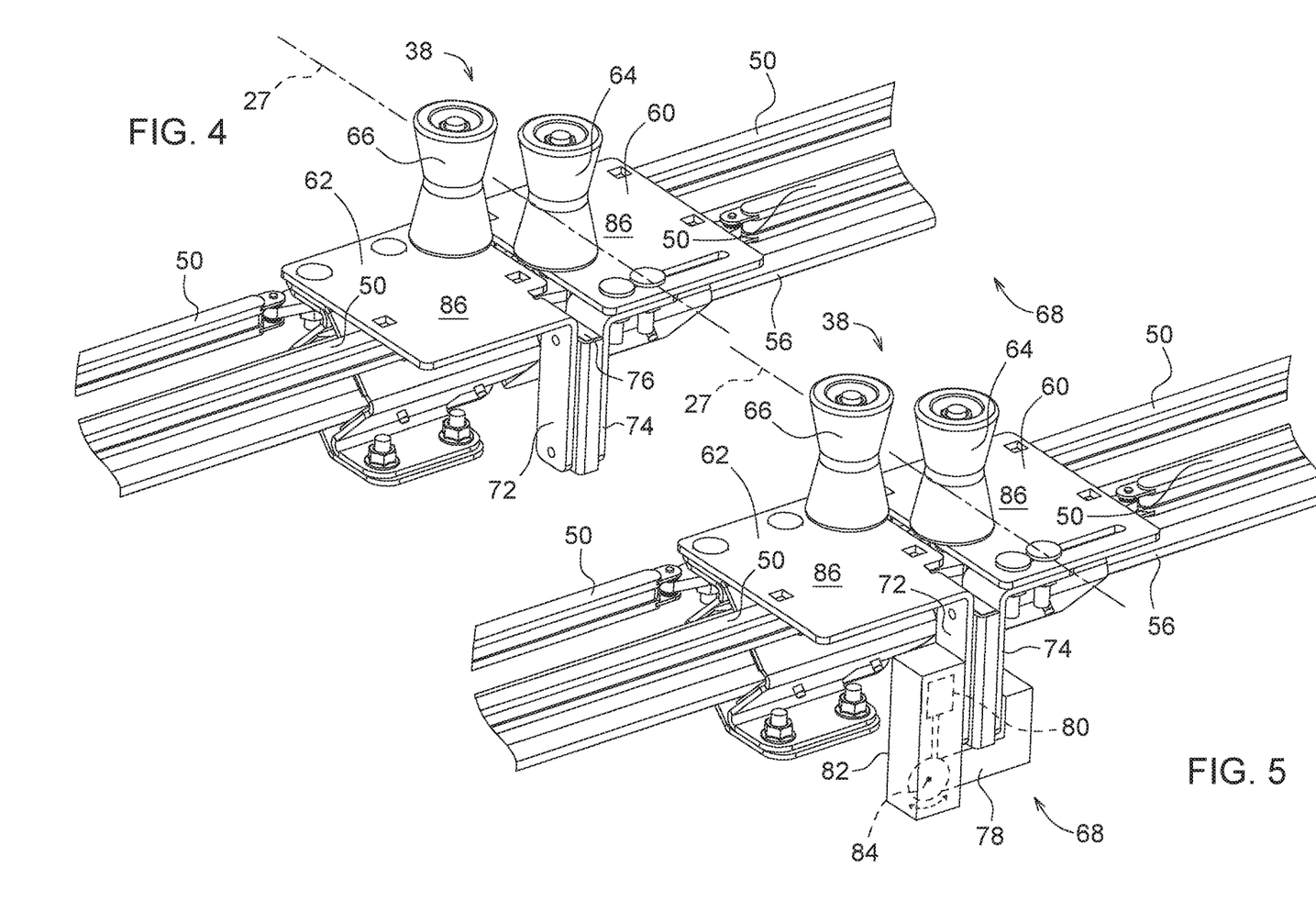
FIG. 4 is an enlarged schematic perspective view of a first embodiment of the gathering apparatus in the operating position.
FIG. 5 is an enlarged schematic perspective view of a second embodiment of the gathering apparatus in the operating position.

FIG. 4 shows a first embodiment of the holding apparatus 68. A first angle bracket 72 and a second angle bracket 74 extend vertically downwardly and are directly adjacent each other when in the operating position. The angle brackets 72, 74 are attached to the lower face of a respective base plate 86 of the holders 60, 62. In each case, one of the gathering elements 64, 66 extends upwardly from its respective base plate 86. A magnet 76 may be disposed between the angle brackets 72, 74, and attached to the first angle bracket 72 of the second holder 62. The magnet 76 may include an electromagnet 76 that is controlled by the control apparatus 70 and which is controllable to generate a magnetic force to attract the ferromagnetic second angle bracket 74 of the first holder 60 and thus fixes together the holders 60, 62 in the operating position. The control apparatus 70 accordingly activates the electromagnet 76 provided the gathering elements 64, 66 are located in the operating position, at least provided a wrapping process is being carried out for encasing the bale. Otherwise, the electromagnet 76 is switched off by the control apparatus 70 in order to be able to separate the holders 60, 62 from one another.

The magnet 76 may alternatively include a permanent magnet 76. In the operating position the permanent magnet 76 generates a magnetic force that fixes the angle brackets 72, 74 together and thus the gathering elements 64, 66 together. This magnetic force or connection is separated by the drive 58 when the drive 58 pulls the gathering elements 64, 66 into the out-of-operation position.

Referring to FIG. 5, an alternative embodiment of the holding apparatus 68 is shown. The alternative embodiment of the holding apparatus 68 shown in FIG. 5 includes a hook 78 that is rotatable by an actuator 80 about an axis 84. The hook 78 is supported on the angle bracket 72 of the holder 62 and in a blocked position encompasses the angle bracket 74 of the other holder 60. By means of the actuator 80, controlled by the control apparatus 70, the hook 78 may be rotated downwardly about the axis 84 into an un-blocked position, which releases the coupling between the two angle brackets 72, 74 in order to move the gathering elements 64, 66 by means of the drive 58 into the out-of-operation position. The control apparatus 70 commands the actuator 80 to move into the position of FIG. 5 after it has commanded the drive 58 to move the gathering elements 62, 64 into the operating position and these elements have reached this operating position, which may be detected by means of the activation time or the power used by the drive 58 or by means of a sensor for detecting the position of the holders 60, 62 and/or the drive train thereof (see for example the elements 100, 102 in FIGS. 6 and 7). The actuator 80 and a gear connecting it to the hook 78 may be arranged in a housing 82.

The electrical supply of the actuator 80 of FIG. 5 and/or of the electromagnet 76 of FIG. 4 may be implemented by a flexible cable which extends from one end of the strut 56 to the holder 62. It might also be conceivable to attach one or two busbars (not shown) to the strut 56, which cooperates or cooperate with one or two current collectors of the holder 62 in order to supply power to the actuator 80 or to the electromagnet 76. If only one busbar is used, the return path may be earthed, i.e. via the strut 56.

In an alternative embodiment, not shown, the hook 78 may be replaced by a bolt which is displaceable by the actuator 80 transversely to the tractive means 50 and releasably couples the holders 60, 62 together, as required.

Figure 6:
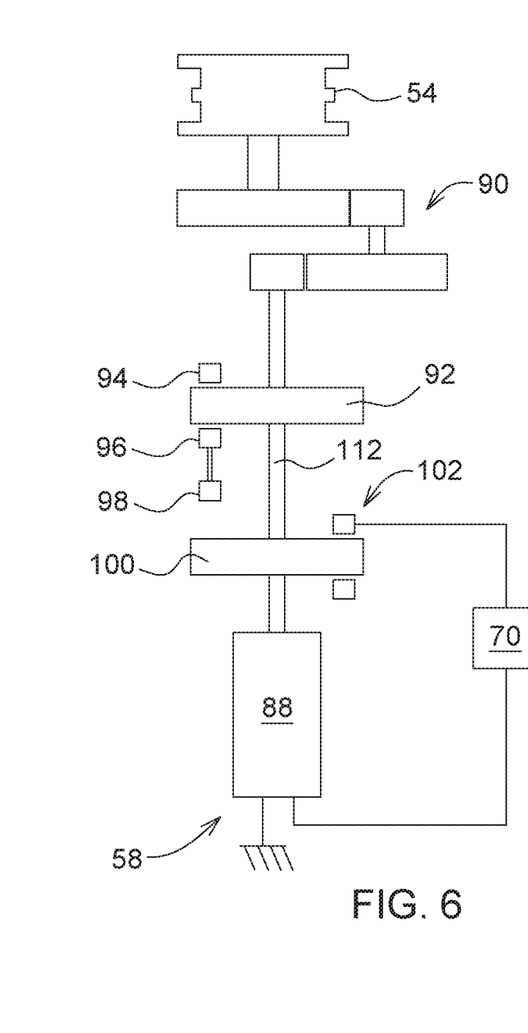
FIG. 6 is a schematic diagram of a drive of the gathering apparatus.

FIG. 6 shows a first embodiment of the drive 58 of the gathering apparatus 38. The drive 58 includes a motor 88. The motor 88 may include an electric motor 88, a hydraulic motor 88, a pneumatic motor 88, or some other similar device. The motor 88 includes a shaft 112 that is connected via a reduction gear 90 to the deflection wheel 54. The shaft 112 is also connected fixedly in terms of rotation to a perforated coding disc 100 which cooperates with a light barrier 102 which informs the controller 70, by means of the detected revolutions of the shaft 112, relative to the position of the gathering elements 64, 66. The controller 70 controls the motor 88 in the above-described manner. Additionally, a brake disc 92 is arranged fixedly in terms of rotation on the shaft 112. The brake disc 92 cooperates with a fixed brake element 94 and a movable brake element 96. The moveable brake element 96 is movable by an actuator 98. The controller 70 commands the actuator 98 to press the brake element 96 against the brake disc 92 and thereby compress the brake disc 92 between the moveable brake element 96 and the fixed brake element 94 when the gathering elements 64, 66 are in the operating position. As a result, the desired securing of the gathering elements 64, 66 is achieved, the securing being released by the control apparatus 70 when the gathering elements 64, 66 are to be moved into the out-of-operation position by activating the electric motor 88 of the drive 58. The electric motor 88, the gear 90 and the detection of the rotational position of the shaft 112 shown in FIG. 6 may also be used in the previous embodiments in which the controller 70, instead of the actuator 98 of the brake of FIG. 6, controls the magnet 76 of FIG. 4 or the actuator 80 of FIG. 5.

Figure 7:
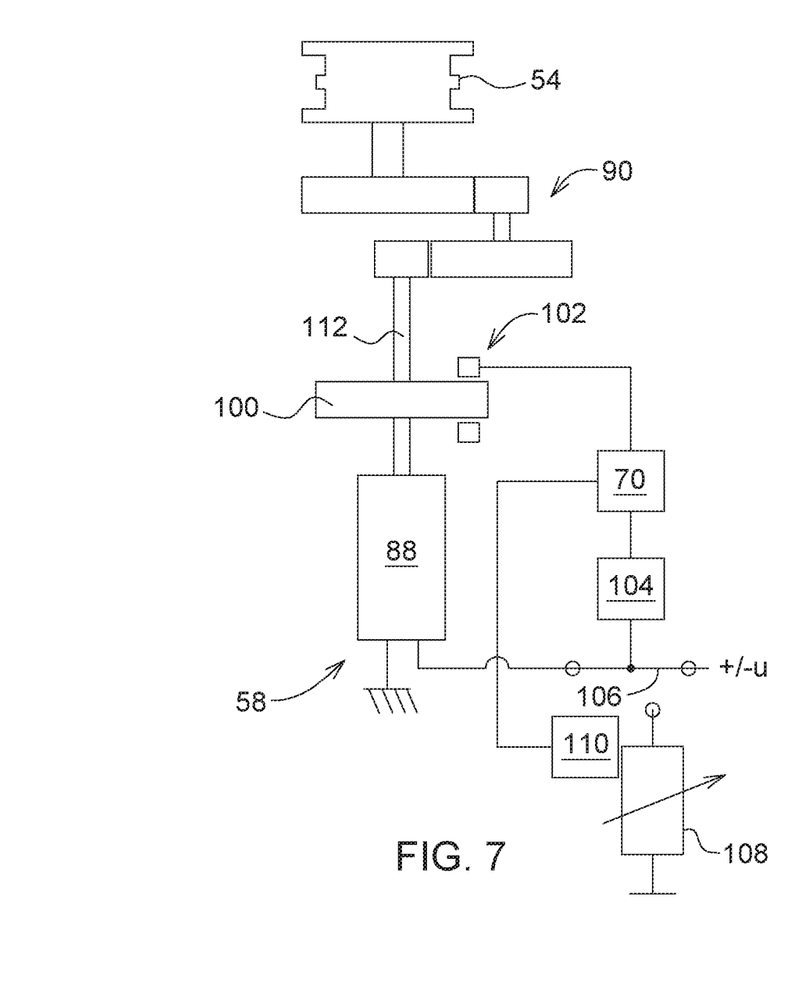
FIG. 7 is a schematic diagram of an alternative embodiment of the drive of the gathering apparatus.

FIG. 7 shows an alternative embodiment of the drive 58 of the gathering apparatus 38. the drive 58 shown in FIG. 7 corresponds substantially to the embodiment of FIG. 6 but the mechanical brake system (i.e., the brake disc 92, the fixed brake element 94, and the moveable brake element 96) is absent, having been replaced by an electric brake system. The electric motor 88 which may be designed as a DC motor serves as a generator, since it is not connected to a reverse-polarity operating voltage+/−U, the electromagnetic force thereof being able to be converted into heat by a resistor 108. The control apparatus 70 is in this case connected to a mechanical or electrical actuator 104, which actuates a switch 106 which selectively connects the electric motor 88 to the operating voltage+/−U or to the resistor 108 which is adjustable by the control apparatus 70 with a mechanical or electrical actuator 110. The control apparatus 70 in this embodiment is able to move the switch 106 into the position shown, when the gathering elements 64, 66 have reached the operating position. Forces, which are required by the film 24 and which potentially act on the electric motor 88, produce an electromagnetic force in the electric motor 88 which is converted into heat by the resistor 108 and thus brakes the electric motor 88 and the gathering elements 64, 66. Otherwise the function is as in the previous embodiments.

The embodiments according to FIGS. 6 and 7 would also enable the gathering elements 64, 66 to be blocked in an intermediate position between the operating position and the out-of-operation position in order to be able to vary the width of the film 24.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A gathering apparatus for a round baler, the gathering apparatus comprising:
   a strut spanning a width;
   a first gathering element supported by the strut and moveable relative to the strut between an operating position in which a first lateral side of a bale wrap material is gathered toward a longitudinal center of the bale wrap material and an out-of-operation position in which the first lateral side of the bale wrap material is not gathered toward the longitudinal center of the bale wrap material;
   a drive coupled to and operable to move the first gathering element between the operating position and the out-of-operation position;
   a holding apparatus coupled to either the first gathering element or the drive and operable to secure the first gathering element relative to the strut in the operating position; and
   wherein the drive includes a motor having an output shaft and a reduction gear coupled to the output shaft for driving a tractive member, wherein rotation of the motor moves the tractive member along a path, which in turn moves the first gathering element between the operating position and the out-of-operation position.

2. The gathering apparatus set forth in claim 1, further comprising a second gathering element supported by the strut, wherein the second gathering element is moveable relative to the strut between the operating position in which a second lateral side of the bale wrap material is gathered toward the longitudinal center of the bale wrap material and the out-of-operation position in which the second lateral side of the bale wrap material is not gathered toward the longitudinal center of the bale wrap material.

3. The gathering apparatus set forth in claim 2, wherein the first gathering element and the second gathering element are arranged opposite each other and move in opposing directions along the strut relative to each other.

4. The gathering apparatus set forth in claim 2, wherein the holding apparatus is coupled to both the first gathering element and the second gathering element to secure the first gathering element and the second gathering element relative to the strut when disposed in the operating position.

5. The gathering apparatus set forth in claim 2, wherein the drive is coupled to and operable to move the second gathering element between the operating position and the out-of-operation position.

6. The gathering apparatus set forth in claim 2, wherein the holding apparatus selectively couples the first gathering element to the second gathering element when disposed in the operating position.

7. The gathering apparatus set forth in claim 2, wherein the holding apparatus includes a first holder attached to the first gathering element and a second holder attached to the second gathering element.

8. The gathering apparatus set forth in claim 7, wherein the holding apparatus includes a magnet operable to attract the first holder and the second holder together.

9. The gathering apparatus set forth in claim 8, wherein the magnet is an electromagnet switchable between an on position to generate a magnetic force and hold together the first holder and the second holder, and an off position not generating the magnetic force.

10. The gathering apparatus set forth in claim 8, wherein the magnet is a permanent magnet operable to apply a magnetic force and hold together the first holder and the second holder in the operating position, and wherein the drive is operable to pull apart the first holder and the second holder against the magnetic force of the permanent magnet in order to move the first gathering element and the second gathering element into the out-of-operation position.

11. The gathering apparatus set forth in claim 7, wherein the holding apparatus includes a hook actuated by an actuator and which is operable to mechanically latch the first holder and the second holder together in the operating position.

12. The gathering apparatus set forth in claim 1, wherein the holding apparatus acts electrically on the motor to prevent rotation of the motor and secure the first gathering element relative to the strut.

13. The gathering apparatus set forth in claim 1, wherein the holding apparatus acts mechanically on the output shaft of the motor to prevent rotation of the shaft and secure the first gathering element relative to the strut.

14. The gathering apparatus set forth in claim 1, wherein the holding apparatus acts mechanically on the tractive member to prevent movement of the tractive member and secure the first gathering element relative to the strut.

15. A round baler comprising:
   a baling chamber operable to form a bale having a cylindrical shape;
   a wrap supply apparatus operable to feed a bale wrap material into the baling chamber for wrapping the bale;
   a gathering apparatus operable to gather lateral sides of the bale wrap material together for feeding the wrap material into the baling chamber or for cutting the bale wrap material once wrapped around the bale in the baling chamber, the gathering apparatus including:
   a first gathering element moveable between an operating position in which a first lateral side of the bale wrap material is gathered toward a longitudinal center of the bale wrap material and an out-of-operation position in which the first lateral side of the bale wrap material is not gathered toward the longitudinal center of the bale wrap material;
   a second gathering element moveable between the operating position in which a second lateral side of the bale wrap material is gathered toward the longitudinal center of the bale wrap material and the out-of-operation position in which the second lateral side of the bale wrap material is not gathered toward the longitudinal center of the bale wrap material;
   a drive operable to move the first gathering element and the second gathering element between the operating position and the out-of-operation position;
   a holding apparatus engageable with at least one of the first gathering element, the second gathering element, or the drive, and operable to secure at least one of the first gathering element and the second gathering element in the operating position;
   a strut supporting the first gathering element and the second gathering element, and spanning a width of the bale wrapping material, wherein the first gathering element and the second gathering element move relative to the strut in opposing directions relative to the strut when moving between the operating position and the out-of-operation position; and wherein the drive includes a motor having an output shaft and a reduction gear coupled to the output shaft for driving a tractive member, wherein rotation of the motor moves the tractive member along a path, which in turn moves the first gathering element between the operating position and the out-of-operation position.

16. The round baler set forth in claim 15, wherein the holding apparatus acts electrically on the motor to prevent rotation of the motor and secure the first gathering element and the second gathering element relative to the strut.

17. The round baler set forth in claim 15, wherein the holding apparatus includes a first holder attached to the first gathering element and a second holder attached to the second gathering element, and wherein the holding apparatus secures the first holder and the second holder together in the operating position.

18. The round baler set forth in claim 17, wherein the holding apparatus includes a magnet operable to attract the first holder and the second holder together.

19. The round baler set forth in claim 17, wherein the holding apparatus includes a hook actuated by an actuator and which is operable to mechanically latch the first holder and the second holder together in the operating position.

20. A gathering apparatus for a round baler, the gathering apparatus comprising:
   a strut spanning a width;
   a first gathering element supported by the strut and moveable relative to the strut between an operating position in which a first lateral side of a bale wrap material is gathered toward a longitudinal center of the bale wrap material and an out-of-operation position in which the first lateral side of the bale wrap material is not gathered toward the longitudinal center of the bale wrap material;
   a drive coupled to and operable to move the first gathering element between the operating position and the out-of-operation position;
   a holding apparatus coupled to either the first gathering element or the drive and operable to secure the first gathering element relative to the strut in the operating position;
   a second gathering element supported by the strut, wherein the second gathering element is moveable relative to the strut between the operating position in which a second lateral side of the bale wrap material is gathered toward the longitudinal center of the bale wrap material and the out-of-operation position in which the second lateral side of the bale wrap material is not gathered toward the longitudinal center of the bale wrap material;
   wherein the holding apparatus includes a first holder attached to the first gathering element and a second holder attached to the second gathering element; and
   wherein the holding apparatus includes a magnet operable to attract the first holder and the second holder together.

21. The gathering apparatus set forth in claim 20, wherein the magnet is an electromagnet switchable between an on position to generate a magnetic force and hold together the first holder and the second holder, and an off position not generating the magnetic force.

22. The gathering apparatus set forth in claim 20, wherein the magnet is a permanent magnet operable to apply a magnetic force and hold together the first holder and the second holder in the operating position, and wherein the drive is operable to pull apart the first holder and the second holder against the magnetic force of the permanent magnet in order to move the first gathering element and the second gathering element into the out-of-operation position.

* * * * *